No. 677,028. Patented June 25, 1901.
J. M. GARRISON.
GLASS SEPARATOR.
(Application filed Aug. 4, 1900.)
(No Model.)

Witnesses:
Inventor.
James M. Garrison
By
Atty's.

UNITED STATES PATENT OFFICE.

JAMES M. GARRISON, OF BELLE VERNON, PENNSYLVANIA.

GLASS-SEPARATOR.

SPECIFICATION forming part of Letters Patent No. 677,028, dated June 25, 1901.

Application filed August 4, 1900. Serial No. 25,957. (No model.)

*To all whom it may concern:*

Be it known that I, JAMES M. GARRISON, a citizen of the United States of America, residing at Belle Vernon, in the county of Fayette and State of Pennsylvania, have invented certain new and useful Improvements in Glass-Separators, of which the following is a specification, reference being had therein to the accompanying drawings.

This invention relates to certain new and useful improvements in glass-separators, and more particularly to automatic glass-separators, and has for its object the provision of novel means whereby glass may be taken from a tank and separated from all impurities or foreign substances that are usually found in glass.

When drawing glass from a tank, the foreign substances or impurities being of less specific gravity than the glass will always float upon the surface of the same, and when the glass is handled these impurities will combine with the same and an inferior quality of ware is produced. To produce a separator from which pure glass may be easily taken, and, furthermore, to produce a device of this class into which glass will be automatically supplied, is the aim of this invention.

A further object of the invention is to produce a device of the above-described character that will be extremely simple in construction, strong, durable, and highly efficient in its operation, and, furthermore, one that will be comparatively inexpensive to manufacture.

With the above and other objects in view the invention finally consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1:
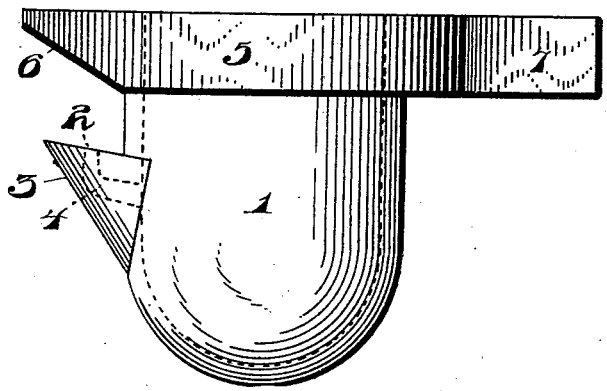
Figure 2:
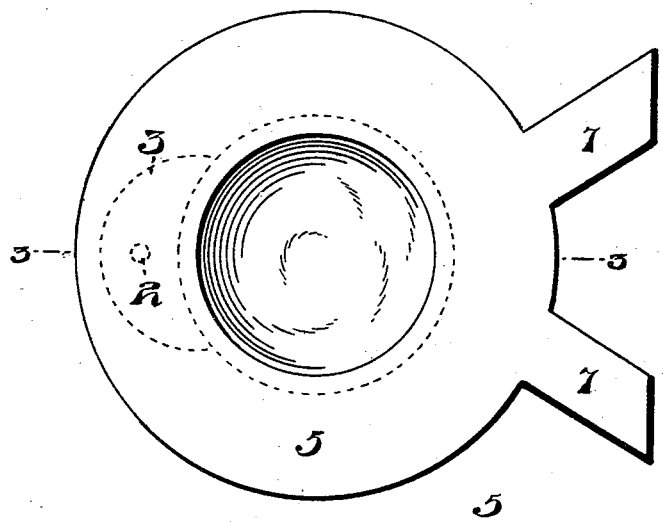
Figure 3:
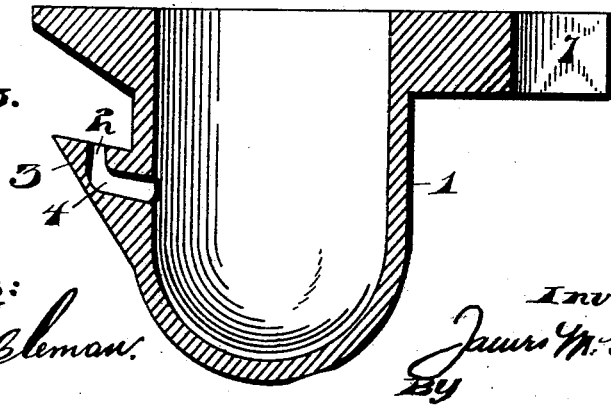

Figure 1 is a side view of my improved separator. Fig. 2 is a top plan view of the same. Fig. 3 is a vertical sectional view of the same, taken on the line 3 3 of Fig. 2.

In the drawings the reference-numeral 1 indicates the body portion of the separator, which is preferably cylindrical in form and is provided with a spout 2, said spout or inlet being formed in the projection 3, formed integral with the body portion. Said spout or inlet forms an elbow 4, the upper opening of which is slightly contracted and gradually increases in width as it extends downwardly and extends at an angle communicating with the interior of the vessel.

The reference-numeral 5 indicates an annular flange formed at the top of the vessel, this flange being partially cut away at an angle on the under face directly above the spout and is indicated by the reference-numeral 6. Directly opposite the said cut-away portion of the annular flange are arranged outwardly-extending arms 7 7. These arms are set at an angle and act as stops, preventing the body of the vessel from coming into contact with the sides of the tank.

The operation of my improved glass-separator is as follows: The vessel being constructed of fire-clay will readily float upon the glass, being submerged in the latter to the under side of the annular flange, said flange and outwardly-extending arms adding to the buoyancy of the vessel as it floats in the glass. The spout or inlet 2 is arranged in such a position that when the vessel is floating in the glass the pure glass will enter the inlet and body portion of the vessel, and all the impurities or foreign substances will remain floating upon the surface of the glass. The glass is then dipped from the vessel in the usual and well-known manner.

Although I preferably construct my improved glass-separator as shown and described, I do not, however, wish to limit myself to this particular form, as various changes may be made in the details of construction without departing from the general spirit of my invention as claimed.

Having thus fully described my invention, what I claim as new, and desire to secure by Letters Patent, is—

1. A glass-separator comprising a vessel having a closed bottom and open top and provided on its side with a projection having an elbow-shaped inlet-port communicating with the interior of the vessel, substantially as described.

2. A glass-separator consisting of a substantially cylindrical vessel open at its top and closed at its bottom, said vessel having an inlet-port through its side about midway of its length, and an integral annular flange formed on the vessel to assist in supporting the vessel when the latter is immersed in the molten glass.

3. A glass-separator consisting of a vessel composed of refractory material, said vessel being open at its top and closed at the bottom, and a projection formed integral with the vessel on one side thereof and provided with an elbow-shaped inlet-port, the inlet end of which port is contracted and the discharge end of which communicates with the interior of the vessel.

4. A glass-separator consisting of a vessel composed of refractory material having an open top and closed bottom, said vessel having an inlet-port in its side about midway of its length, a flange formed integral with the vessel at its top to assist in supporting the vessel when the latter is immersed in the molten glass, and projecting stops carried by the flange, as and for the purpose described.

5. A glass-separator consisting of a vessel composed of refractory material having an open top and a closed bottom, said vessel having an inlet-port in one side, the inlet end of said port being above the horizontal line of the discharge end of the port, and means carried by the vessel for assisting in supporting the same when immersed in the molten glass.

6. A glass-separator consisting of a vessel composed of refractory material having an open top and closed bottom, said vessel having an inlet-port in one side, the inlet end of said port being contracted, and above the horizontal line of the discharge end of the port, and means for assisting in supporting the vessel when the latter is immersed in the molten glass.

7. A glass-separator consisting of a vessel composed of refractory material with an open top and closed bottom, and having an inlet-port in its side, the inlet end of said port being contracted and above the horizontal line of the discharge end of the port, as and for the purpose described.

In testimony whereof I affix my signature in the presence of two witnesses.

JAMES ×̇ M. GARRISON.
his mark

Witnesses:
JOHN NOLAND,
H. C. EVERT.